128-24.A     35                  *Bacterial suspension.*
*8900 cycles/sec.*
Feb. 11, 1941.     L. A. CHAMBERS ET AL     2,230,997
METHOD OF EXTRACTING CONSTITUENTS OF LIVING CELLS
Filed Dec. 23, 1937
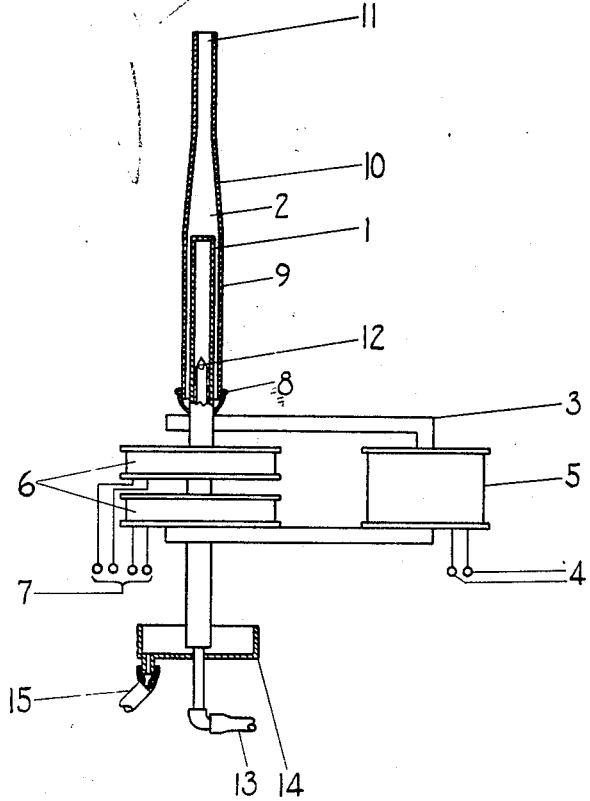
INVENTORS
LESLIE A. CHAMBERS
EARL W. FLOSDORF
BY
ATTORNEY.

Patented Feb. 11, 1941

2,230,997

UNITED STATES PATENT OFFICE 2,230,997

METHOD OF EXTRACTING CONSTITUENTS OF LIVING CELLS

Leslie A. Chambers, Upper Darby, and Earl W. Flosdorf, Ardmore, Pa., assignors to University of Pennsylvania, Philadelphia, Pa.

Application December 23, 1937, Serial No. 181,452

10 Claims. (Cl. 167—78)

The present invention relates to the extraction of useful substances from living cells, especially biologically active substances. More particularly the present invention relates to the extraction of labile antigenic constituents from bacteria or the like.

It has heretofore been attempted to extract antigenic constituents from bacteria and the like and in some cases such extractions have been successfully made. All these processes involve the killing of the bacteria in some manner. However, the killing of bacteria by hitherto available agents has been found to destroy or alter at least some of their antigenic constituents in most cases and in many cases the bacterial antigens have resisted all hitherto available methods of separation.

The present invention provides a new method involving the use of compressional wave energy for the extraction from living cells of certain desired substances which are not destroyed by treatment with such compressional wave energy.

The partial sterilization of bacterial cultures by the action of compressional waves has heretofore been carried out. The coagulation of certain protein solutions by compressional waves has also been observed. Now we have discovered that certain proteins and/or other substances, in particular those comprising the antigenic constituents of bacteria or other living cells, are not coagulated by the application of intense compressional wave vibrations. On the other hand, the proteins and/or other substances comprising the antigenic constituents of bacteria or other living cells are often extremely labile and rapidly become inactivated or changed in such a manner as to render them useless for immunological or other desired purposes.

The method of the present invention is applicable to the extraction from living cells of desired substances whenever such substances are not destroyed by treatment with intense compressional waves. Furthermore, the present invention is of particular utility whenever the substances to be extracted are extremely unstable in nature under ordinary conditions or under the conditions involved in other methods of extraction.

The method of carrying out the invention will be understood from the general discussion and specific illustrations given below. While this discussion refers chiefly to antigenic constituents of bacteria, it will be understood that the invention is not limited in its application to bacteria in a narrow sense nor to the extraction of antigens, but that it applies to the extraction from any living cells of any desired constituents not destroyed by compressional waves. On the other hand, it will also be understood that the present invention is particularly adaptable to the extraction of immunologically active antigens from bacteria. The latter antigens may be employed in a suitable solution by injecting them directly into the human body to bring about a condition of immunity to attacks of a corresponding bacteria or they may be injected into certain animals to produce a serum containing the corresponding antibodies, which may in turn be injected into humans to combat the corresponding bacteria already present in the system.

According to the present invention the extraction of the desired substances is accomplished by the rapid destruction of the living cells by means of compressional wave energy and subsequent filtration to remove intact cells and fragments thereof. Further, if the desired substance to be extracted is one which is extremely labile, the destruction of the cells by vibration and subsequent filtration is carried out as rapidly as possible and at a temperature low enough to prevent or materially slow down the reaction responsible for the inactivation of the substances. In addition, if the substance is not to be used immediately, it is rapidly dried to prevent further deterioration.

More specifically according to the present invention a suspension of the desired bacteria is exposed to the action of intense compressional wave vibration. The period of treatment is long enough to kill the greater number of the bacteria. During the period of treatment the temperature of the bacterial suspension is continuously kept low, preferably as near freezing as possible to prevent or slow down as much as possible the reactions responsible for the deterioration of the antigenic substances. However, a temperature of approximately 15 degrees centigrade has been found satisfactory in the specific cases mentioned below. Inasmuch as the length of treatment required is to a large extent dependent upon the intensity of vibration, it is important to have a sufficient intensity to keep the period of treatment as short as possible in order to avoid excessive deterioration of the antigenic substances which are to be extracted. Consequently the vibration source should have an amplitude sufficient to produce cavitation in the liquid.

The vibration of such a bacterial suspension results in a rapid decrease in opacity until the liquid becomes translucent if not completely clear. Subsequently to the compressional wave treatment the suspension is centrifuged to remove the debris resulting from the destruction of the bacteria, followed by filtration to remove the bacterial residue and sterilize the liquid. The soluble protein which is contained in the liquid obtained after filtration is the corresponding bacterial antigen and is a rule extremely unstable. It may deteriorate completely during three days of storage at two to four degrees centigrade.

It may, however, be stored in dry form, obtained, for example, by rapid freezing followed by desiccation from the frozen state. It appears that in this form the antigen can be stored for at least a year without deterioration.

A suitable apparatus for the treatment of bacterial cultures with compressional waves is shown in the drawing. This apparatus consists of a magnetostrictive vibratable tube 1 which may be made of nickel. This tube has a capped end 2. A unidirectional polarizing magnetic field is applied to the magnetostriction rod by means of the magnetic yoke 3 magnetized by direct current connected to the terminals 4 of the coil 5. Alternating current magnetization is provided by the coils 6 whose terminals 7 are connected to a suitable source of alternating current having a frequency preferably suitable for the energization in longitudinal vibration of the magnetostrictive tube 1 at its resonant frequency. At the nodal point of the tube a rubber coupling 8 is provided which makes a liquid-tight joint with the tube.

Surrounding the nickel tube and fitting closely to the coupling member 8 is a cylindrical tube 9 which may be made of glass. This glass vessel has its upper portion 10 made in the form of an inverted cone with an apical aperture 11 small enough to permit convenient sterile closure, but large enough to allow passage of a pipette. The entire assembly, nickel tube, glass vessel and rubber joint is preferably made to be easily removable from the coil support so that it can be sterilized by autoclaving or filled and emptied under aseptic conditions.

The bacterial suspension to be treated is inserted in the glass vessel 9 so that it can be acted upon by the vibrations of the tube 1. In order to maintain the bacterial suspension at a sufficiently low temperature during treatment a smaller tube 12 is inserted within the vibrator 1 through its lower open end, the other end 13 of the tube 12 being connected to a cold-water supply. By this means a jet of cold water is continually projected against the upper inner end and walls of the vibrating tube. The water so used is permitted to run down the inner walls of the tube into the container 14 and out through a waste pipe 15.

Since the operation of the magnetostrictive vibrator in itself does not form any part of this invention, the operating circuit has not been shown in detail. A suitable arrangement of such a circuit will be found in United States Patent No. 1,992,938, issued March 5, 1935, to Leslie A. Chambers et al.

Satisfactory production of compressional waves can be obtained if the vibrator is, for example, of such size and shape that the system is in resonance at 8900 cycles per second and vibrating with an amplitude of the order of 0.001 cm. or just below the critical amplitude required for the rupture of the nickel. On the other hand, it will be understood that any suitable apparatus for producing the vibrations may be employed, provided that cavitational amplitude can be obtained and provided that the apparatus can be properly sterilized.

The following are examples of the manner in which the process of the present invention can be carried out:

A culture of *Bacterium typhosum* containing a labile virulence (Vi) antigen may be cultured on infusion agar (ph 7.2). The washings from 8 Roux bottles is suspended in physiological saline solution and diluted to a volume of 20 ml. This heavy suspension is placed within the glass vessel 10 and vibrated for approximately one hour, at the end of which time the liquid will show a decrease in opacity, being translucent if not entirely clear. During the treatment a flow of water sufficient to maintain the bacterial suspension at a temperature not greater than 15° C. is passed thorugh the tube 12 within the vibrator. Where the internal diameter of the glass vessel 10 was about 2.5 cms., a continuous flow of water having a temperature of 10° C. and flowing at the rate of 2 liters per minute has been found sufficient to maintain the 15° temperature level in the suspension.

After vibration for one hour, the suspension is centrifuged to remove the debris. Since the bacterial suspension is not rendered perfectly sterile by one hour of vibration in view of the logarithmic survival curve, it is necessary to pass the clear liquid obtained from the centrifuge rapidly through a filter, such as a Berkfeld filter, under conditions permitting minimum adsorption of active material. For this reason it is desirable to dilute the liquid obtained from the centrifuge with saline to approximately four times its volume. The resulting clear liquid will precipitate the "Vi" antibody in sera from which all somatic and flagellar antibodies have previously been absorbed. After such precipitation this absorbed serum will no longer cause the agglutination of organisms containing the "Vi" antigen.

As a further example a virulent strain of *Streptococcus hemolyticus* (Griffith's Type I) in the muccoid phase and of recent animal passage may be used. Organisms in 7.5 liters of 18 hour infusion broth culture are separated by centrifugalization, yielding about two ml. of solid organisms. These are then suspended in 18 ml. of 0.85% NaCl. The final concentration of living cells will be of the order of $10^{11}$ per mm.

This suspension is then exposed to vibration in the glass vessel for one hour. Subsequently it is centrifugalized to remove the debris. By this operation approximately 18 ml. of clear liquid will be recovered. Subsequently the liquid is filtered to sterilize it as in the above example. The soluble protein in the filtrate will absorb from immune serum the antibody responsible for phagocytosis. The substance is destroyed by formalin and is inactivated at pH 10. It is also inactivated by heating for 30 minutes at 36° C. which is the thermal death point of the organisms from which the material was extracted. Furthermore, the lability of this antigen is such that it deteriorates completely during three days of storage at 2° to 4° C. and it must, therefore, be stored in dry form.

The manner in which the process of the present invention is carried out will now be evident to those skilled in the art. It will be noted that where the antigens or other substances to be extracted are extremely labile, as is usually the case, it is of importance throughout to maintain conditions such as to prevent or to slow down as much as possible the reactions responsible for the deterioration of the antigens. To this end, the solution in which the organisms are treated with vibratory energy must be one in which the antigens are soluble. For immunological purposes an isotonic saline solution is usually the most convenient. The temperature of the solution during and after treatment must be kept low enough to prevent any great deterioration of the antigens. Likewise the time involved between the beginning of sonic treatment to the conclusion of the drying process should be as short as possible, for the same reason. Furthermore, filtration must be done under conditions to prevent undue adsorption of the antigenic material by the filter; it must therefore be done as rapidly as possible and preferably in a dilute solution. It should also be noted that the pH of the solution under treatment must be kept within the range in which the antigens are not destroyed. A neutral solution is desirable, but within the range of pH 6.8 to pH 7.8 satisfactory results will usually be obtained. Finally the drying of the antigens must be done in a manner to prevent deterioration so far as possible. Rapid freezing followed by immediate desiccation from the frozen state has proven satisfactory.

Having now described our invention, we claim:

1. The method of extracting the labile antigen from a culture of a streptococcus which comprises treating a suspension of the streptococcus with compressional wave vibrations, the intensity of the vibrations and the duration of treatment being sufficient to produce destruction of some of the streptococci, removing the bacterial residue as well as other suspended matter, the temperature of the liquid during and after treatment being maintained not substantially higher than 15° centigrade, and transforming the extracted antigenic constituents into dry form.

2. The method of extracting the labile virulence (Vi) antigen from a culture of *Bacterium typhosum* which comprises suspending a quantity of the organisms in a saline solution, subjecting the suspension to the action of compressional wave vibrations, the intensity of the vibrations and the duration of treatment being sufficient to produce disruption of some of the organisms and the temperature of the liquid being maintained not substantially greater than 15° centigrade, and removing the bacterial residue and suspended matter.

3. The method of extracting the labile virulence (Vi) antigen from a culture of *Bacterium typhosum* which comprises suspending a quantity of the organisms in a saline solution, subjecting the suspension to the action of compressional wave vibrations at a sonic frequency at cavitational amplitude for a period of time not substantially greater than one hour while maintaining the temperature not substantially greater than 15° centigrade, and removing the bacterial residue and suspended matter.

4. The method of extracting the labile virulence (Vi) antigen from a culture of *Bacterium typhosum* which comprises suspending a quantity of the organisms in a saline solution, subjecting the suspension to the action of compressional wave vibrations at a temperature not substantially greater than 15° centigrade, the intensity of the vibrations and the duration of treatment being sufficient to produce disruption of some of the organisms, removing the residual organisms and suspended matter, and immediately converting the antigen in the resulting solution into dry form.

5. The method of extracting the labile antigen from a culture of *Streptococcus hemolyticus* which comprises suspending a quantity of the organisms in a saline solution, subjecting the suspension to the action of compressional wave vibrations at a temperature not substantially greater than 15° centigrade, the intensity of the vibrations and the duration of treatment being sufficient to produce disruption of some of the organisms, and removing the residual organisms and suspended matter.

6. The method of extracting the labile antigen from a culture of *Streptococcus hemolyticus* which comprises suspending a quantity of the organisms in a saline solution, subjecting the suspension to the action of intense compressional wave vibrations at a sonic frequency at cavitational amplitude for a period of time not substantially greater than one hour, the temperature of the liquid being maintained at not substantially greater than 15° centigrade, and removing the residual organisms and suspended matter.

7. The method of extracting the labile antigen from a culture of *Streptococcus hemolyticus* which comprises suspending a quantity of the organisms in a saline solution, subjecting the suspension to the action of intense compressional wave vibrations at a temperature not substantially greater than 15° centigrade, the intensity of the vibrations and the period of treatment being sufficient to produce disruption of some of the organisms, removing the residual organisms and suspended matter and immediately converting the antigen in the resulting solution into dry form.

8. The method of extracting labile bacterial antigenic constituents which comprises treating a suspension of the bacteria in a solution in which said antigenic constituents are soluble with compressional wave vibrations of sufficient intensity to disrupt the cells and for a period of time sufficient to release a quantity of antigenic constituents from the bacteria and removing the bacterial residue as well as other suspended matter, the temperature of the liquid being continuously maintained below that at which substantial deterioration of the antigenic constituents takes place during the period of time required for treatment.

9. The method of extracting labile bacterial antigenic constituents which comprises exposing a suspension of the bacteria in a solution in which the antigenic constituents are soluble to compressional wave vibrations of cavitational amplitude for a period of time not substantially greater than one hour, and rapidly removing the bacterial residue as well as other suspended matter, the temperature of the liquid being continuously maintained below that at which substantial deterioration of the antigenic constituents takes place during the period of time required for treatment.

10. The method of extracting labile bacterial antigenic constituents which comprises exposing a suspension of the bacteria in a solution in which the antigenic constituents are soluble to compressional wave vibrations of sufficient intensity to disrupt the cells and for a period of time sufficient to release a quantity of antigenic constituents from the bacteria, removing the bacterial residue as well as other suspended matter and immediately converting the antigenic constituents into dry form, the temperature of the material being continuously maintained below that at which substantial deterioration of the antigenic constituents takes place during the period of time required for the treatment.

LESLIE A. CHAMBERS.
EARL W. FLOSDORF.